United States Patent
Sathyanarayana et al.

(10) Patent No.: US 12,238,216 B2
(45) Date of Patent: Feb. 25, 2025

(54) SYSTEMS AND METHODS FOR SECURE STREAMING ACROSS A DISTRIBUTED PLATFORM

(71) Applicant: RingCentral, Inc., Belmont, CA (US)

(72) Inventors: Karthik Sathyanarayana, Sunnyvale, CA (US); Ravi Kalluri, San Jose, CA (US); Diego Fernando Besprosvan, Palo Alto, CA (US); Chen Kong, Hangzhou (CN)

(73) Assignee: RingCentral, Inc., Belmont, CA (US)

( * ) Notice: Subject to any disclaimer, the term of this patent is extended or adjusted under 35 U.S.C. 154(b) by 184 days.

(21) Appl. No.: 18/175,128

(22) Filed: Feb. 27, 2023

(65) Prior Publication Data

US 2024/0275598 A1    Aug. 15, 2024

(30) Foreign Application Priority Data

Feb. 9, 2023   (CN) .......................... 202310099265.0

(51) Int. Cl.
   *H04L 9/32* (2006.01)
   *H04L 9/30* (2006.01)
   *H04L 9/40* (2022.01)
(52) U.S. Cl.
   CPC .............. *H04L 9/3213* (2013.01); *H04L 9/30* (2013.01); *H04L 9/3247* (2013.01); *H04L 63/0457* (2013.01)
(58) Field of Classification Search
   CPC ....... H04L 9/3213; H04L 9/30; H04L 9/3247; H04L 63/0457; H04L 63/0807
   See application file for complete search history.

(56) References Cited

U.S. PATENT DOCUMENTS

2024/0080313 A1 *   3/2024   Parla ...................... H04L 67/14

OTHER PUBLICATIONS

Zhang Manling et al., "Securing Azure CDN assets with token authentication", Docs.Microsoft.com, Dec. 16, 2021, 9 pages, https://learn.microsoft.com/en-us/azure/cdn/cdn-token-auth.

* cited by examiner

*Primary Examiner* — Azizul Choudhury
(74) *Attorney, Agent, or Firm* — Ansari Katiraei LLP; Arman Katiraei; Sadiq Ansari

(57) ABSTRACT

Disclosed is a system and associated methods for secure media stream distribution across different platforms associated with different Internet domains. A first node of a first platform receives a first request from a device, performs a first verification based on credentials provided by the device matching stored credentials, generates a first signed token, and provides the first signed token with a second link for the device to access the requested media stream from a second network node of a second platform. The second network node determines that the device was verified at the first network node based on a second stream request from the device including the first signed token, generates a second token that uniquely identifies the device in the second domain, and streams requested stream data to the device in response to performing a second verification based on requests for the stream data including the second token.

19 Claims, 5 Drawing Sheets

SYSTEMS AND METHODS FOR SECURE STREAMING ACROSS A DISTRIBUTED PLATFORM

CROSS-REFERENCE TO RELATED APPLICATIONS

This application claims priority to Chinese Application No. CN 202310099265.0 filed Feb. 9, 2023, the entire contents of which are incorporated herein by reference.

TECHNICAL FIELD

The present disclosure relates generally to the field of media content streaming over a data network. Specifically, the present disclosure relates to systems and methods for secure streaming across a distributed platform.

BACKGROUND

HyperText Transfer Protocol ("HTTP") Live Streaming ("HLS"), HTTP dynamic streaming ("HDS"), Dynamic Adaptive Streaming over HTTP ("DASH"), and other HTTP streaming protocols lack security protections that protect the distributed media streams from unauthorized access. For instance, few HTTP streaming protocols support encryption of the streaming data prior to transmission over a data network, however they do not verify the identity of a client device requesting a particular stream Uniform Resource Locator ("URL").

Although signed cookies may be used for device verification, some browsers disable the storage of cookies. Cross-site restrictions also prevent the usage of signed cookies across a distributed platform using multiple web domains for browsers that store the signed cookies. Accordingly, complicated Digital Rights Management ("DRM") solutions are implemented to secure the HTTP-based stream distribution. The DRM solutions may encrypt the content at the source, and may require specialized hardware and software at the destination (e.g., the client device) to decrypt the stream before playback. In certain deployments, the DRM solutions may be implemented using software only techniques. However, content providers impose certain restrictions on the higher quality of media streams consumed by clients. The DRM solutions often involve licenses and license servers to authenticate and authorize client access to different streams. In any case, the DRM solutions impose additional hardware and/or software overhead on the client devices that request and playback the streams, thereby adding playback start latency to the user experience and causing the DRM-secured stream to be incompatible with or inaccessible by some devices of authorized users that lack the additional hardware and/or software required to support to DRM solutions.

DETAILED DESCRIPTION OF PREFERRED EMBODIMENTS

Figure 1:
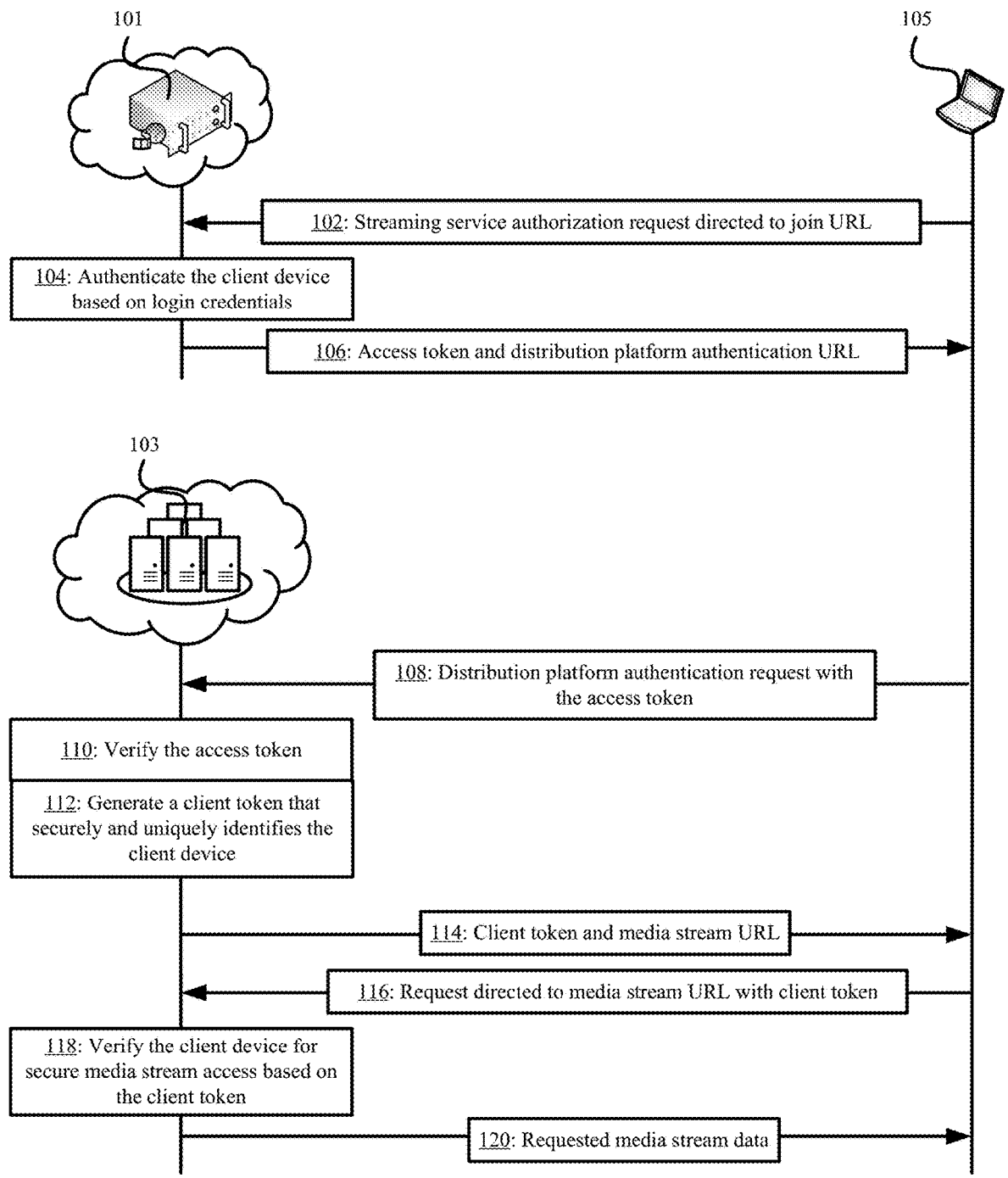
FIG. 1 illustrates an example for secure stream distribution across different platforms using multiple tokens in accordance with some embodiments presented herein.

The current disclosure provides a technological solution to the technological problem of securing the distribution of media content (also referred to as media streams) over a data network. The current disclosure provides a secure distribution system and associated methods for configuring and enforcing different levels of security for the HyperText Transfer Protocol ("HTTP")-based distribution of different media content to different client devices across different network domains, nodes, and/or platforms. The secure streaming implemented by the secure distribution system does not impose new or additional hardware or software requirements on the client devices that access the media content. For instance, the secure distribution system enforces geographic restrictions, prevents link or credential sharing, enforces device restrictions, enforces time-of-day restrictions, enforces platform restrictions, and/or enforces other configurable restrictions that prevent unauthorized access to the media content without having to encrypt the media content, manage licenses, perform off-platform authorization, and/or implement other resource intensive procedures associated with existing Digital Rights Management ("DRM") techniques.

The secure distribution system therefore provides a lightweight solution for secure stream distribution that is compatible with client devices that use HyperText Transfer Protocol ("HTTP") Live Streaming ("HLS"), HTTP dynamic streaming ("HDS"), Dynamic Adaptive Streaming over HTTP ("DASH"), and other HTTP streaming protocols to access and playback media streams. The secure distribution system may replace or work in combination with existing DRM solutions to prevent unauthorized stream access.

The secure distribution system implements the security and/or access controls via one or more tokens that are generated and exchanged as part of the stream access procedure. The tokens are not subject to the same cross-site restrictions and do not require the same browser support as signed cookies. Accordingly, the tokens may be used to authorize client access and secure stream distribution when the authorization and distribution are performed at different domains, nodes, and/or platforms. This allows a stream service provider to securely authorize client access to one or more media streams on their own domain, nodes, or platform, and to offload the secure distribution of those one or more media streams from the domain, nodes, or platform of a Content Delivery Network ("CDN"), cloud hosting platform, and/or third-party platform. At each domain, node, or platform, media stream access is secured with the generated and exchanged tokens.

In some embodiments, each token encodes different access restrictions that are defined for a particular media stream and/or the client device requesting access to the particular media stream. Accordingly, the secure distribution system secures media stream distribution by invalidating or discarding requests from a client device that do not include a system-generated token that identifies that client device, preventing unauthorized access to a particular media stream or stream Uniform Resource Locator ("URL") by a first client device using a token that was generated for a second client device, and/or preventing a client device using a valid token from accessing a media stream outside the parameters specified for that media stream in the token. For instance, the token may specify that the media stream is only accessible from a particular geographic region, at a specific time-of-day, with a specific type of device, and/or configurable access parameters that limit the who, what, when, where, and how the media stream may be accessed.

FIG. 1 illustrates an example for secure stream distribution across different platforms using multiple tokens in accordance with some embodiments presented herein. The different platforms include stream service provider 101 and distribution platform 103. Stream service provider 101 corresponds to the site, service, or network node that authorizes client devices for access to different media streams that are distributed from sites, nodes, and/or resources of distribution platform 103. Accordingly, stream service provider 101 includes one or more devices or machines for authenticating client access to a streaming service, and distribution platform 103 includes one or more devices or machines on a different network or domain than stream service provider 101 for the distribution of the streaming service media streams.

Client device 105 issues (at 102) a streaming service authorization request to stream service provider 101. The streaming service authorization request may include login credentials for authorizing client device 105 to access the streaming service. In some embodiments, the stream service authorization request includes a join URL for requesting a particular media stream from stream service provider 101, and the join URL may specify a first domain name or network for accessing the streaming service, sites, and/or nodes of stream service provider 101. The requested media stream may be an online or live event (e.g., sporting event, concert, webinar, conference, etc.) that is streamed over a data network, a recorded event streamed at a fixed schedule (also known as linear content), or recorded media content served on demand (e.g., video-on-demand, movies, television programming, social media videos, etc.).

Stream service provider 101 authenticates (at 104) client device 105 based on the provided login credentials. If the login credentials are invalid, then stream service provider 101 restricts client device 105 from accessing the requested media stream or accessing the streaming service. If the login credentials are valid, then stream service provider 101 generates a signed access token that is encoded and that uniquely identifies client device 105, and provides (at 106) the signed access token to client device 105 with a distribution platform authentication URL. In certain embodiments, JavaScript Web Token ("JWT") format is used for representing the signed access token. The signed access token includes stream information and other constraints, all of which are encoded in a format suitable for transportation over the Internet, and a signature is generated using a secure hash function (e.g., SHA256) applied over the encoded portion of the access token with a private key (known only to stream service provider 101). Stream service provider 101 also generates (at 104) a Unique User Identifier (UUI) based on the login credentials of the user and provides (at 106) it along with the signed access token in a separate header.

The distribution platform authentication URL redirects, forwards, or transfers client device 105 to distribution platform 103 where the requested media stream and/or other media streams of the streaming service are distributed on behalf of stream service provider 101. Accordingly, client device 105 issues (at 108) a distribution platform authentication request with the signed access token to distribution platform 103.

Distribution platform 103 verifies (at 110) the signed access token to determine that client device 105 has been authorized to access the requested media stream identified in the distribution platform authentication URL. The verification (at 110) of the signed access token is performed in lieu of authorizing client device 105 with login credentials. In some embodiments, security policies of stream service provider 101 may prevent the sharing of client device login credentials and/or other client device authorization with distribution platform 103 or other third-parties. Accordingly, the access token verification (at 110) allows distribution platform 103 to securely verify the identity of client device 105 and, as a result, verify that client device 105 was successfully authenticated by stream service provider 101 without having to expose the login credentials and/or other private account access information with distribution platform 103. In some embodiments, the signed access token is a single-use token and is also associated with an expiration time after which it is regarded as invalid, thus preventing it from being used multiple times or being used after a certain predefined time period.

In some embodiments, verifying (at 110) the access token includes decoding the access token that was encoded and signed using a private key accessible only by stream service provider 101, comparing the decoded parameters and signature (e.g., that is generated by using the public key stored in distribution network 103) to identifying information included with the distribution platform authentication request (e.g., identifying information within the message header), and verifying that client device 105 was authorized for secure stream access by stream service provider 101. Accordingly, if client device 105 attempts to reuse the access identifier that was generated for another client device 105, distribution platform 103 detects the unauthorized reuse of the signed access token and rejects the request. Similarly, if client device 105 attempts to request and/or access the stream from distribution platform 103 without prior authorization from stream service provider 101 by directly requesting the stream from distribution platform 103 without the signed access token or with an invalid access token, distribution platform 103 detects the unauthorized access and rejects the request.

Distribution platform 103 generates (at 112) a client token upon successful verification (at 110) of the signed access token. In some embodiments, distribution platform 103 generates (at 112) the client token to replace the signed access token (e.g., identifying information included in the signed access token) as client device 105 switches from accessing stream service provider 101 in a first network to accessing distribution platform 103 in a different second network. For instance, network addressing, user-agent information, and/or other identifying information may change as client device 105 uses different network cards, networks, or applications when accessing stream service provider 101 and distribution platform 103. In some embodiments, distribution platform 103 generates (at 112) the client token to replace the signed access token because the client token may incorporate various access restrictions that are configured and/or enforced for the requested stream and/or client device 105 at distribution platform 103. For instance, distribution platform 103 may be configured with an access restriction that prevents the type of device associated with client device 105 from accessing the requested stream's specific video and/or audio resolutions.

Distribution platform 103 generates (at 112) the client token as a client signed token to encode or encrypt the identifying information included with the distribution platform authentication request and/or access restrictions specified for the requested stream, user and/or client device 105. The identifying information includes values of one or more request headers and/or other information derived via the Transmission Control Protocol and/or Internet Protocol ("TCP/IP") connection between the distribution platform 103 and client device 105. The request headers include standard HTTP request headers such as User-agent, Referrer, Authorization, etc., and/or custom headers such as Unique User Identifier ("UUI"), client device identifier, etc. Other identifying information such as the client IP address, client country, stream path, etc. is derived via the request path or TCP/IP connection. Such identifiers are referred to as client identifiers. In some embodiments, the client token is formatted as a set of tag-value pairs such that a tag is an attribute and a value is its corresponding value. One of the attributes represents the version of the client token that defines the set of client identifiers to be used for generating the signature attribute. The value of the signature tag is generated by using a secure hash (e.g. SHA256) over the client identifiers along with a secret known only to distribution platform 103. Every different combination and order of the client identifiers results in a unique signature that prevents access to the hosted streams by other unauthorized client devices spoofing the identifying information of client device 105 or attempting to reuse the client identifier that was generated for another client device. In other words, the client token is signed to prevent tampering or changing the identifying information and/or access restriction used to define the client token.

Distribution platform 103 provides (at 114) the client token with one or more stream URLs to client device 105. The one or more stream URLs correspond to the links, addressing, and/or other identifiers with which client device 105 may request and/or access the stream manifest, stream segments, and/or other stream data.

Client device 105 issues (at 116) a request for the stream manifest or a particular stream segment by specifying the stream URL in the request and by including the client token with the request. Distribution device provides secure access to the requested stream data by verifying (at 118) client device 105 based on the encoded parameters within the client token. Specifically, distribution platform 103 verifies (at 118) that the client device, as identified in the client token, issued (at 116) the request and/or satisfies any access restrictions specified for the requested media stream and client device 105 in the client token. Distribution platform 103 transmits (at 120) the requested manifest or segment in response to successfully verifying (at 118) client device 105 using the client token included with the stream data requests. For each stream manifest or segment request, client device 105 includes the client token, and distribution platform 103 continues the secure stream distribution by verifying the client token in each and every request issued from client device 105.

The secure distribution system and securing the stream distribution with the combination of the access token and the client token allow different media streams to be securely distributed from different distribution platforms using standardized HTTP-based streaming protocols, and allows stream service providers to authorize and control access to their streams and/or services while offloading the distribution of the streams to different third-party platforms. Moreover, the secure distribution system prevents many of the same types of unauthorized access as DRM-based security controls without the additional latency, hardware requirements, and/or processing overhead associated with DRM-based security controls. Consequently, client device 105 may include any device that is capable of requesting and playing back media streams using one or more HLS, HDS, DASH, and/or other HTTP-based streaming protocols without having DRM support, and/or may securely access the media streams from the secure distribution system without the licensing, encryption, hardware requirements, and/or specialized software required by a DRM-based solution.

Figure 2:
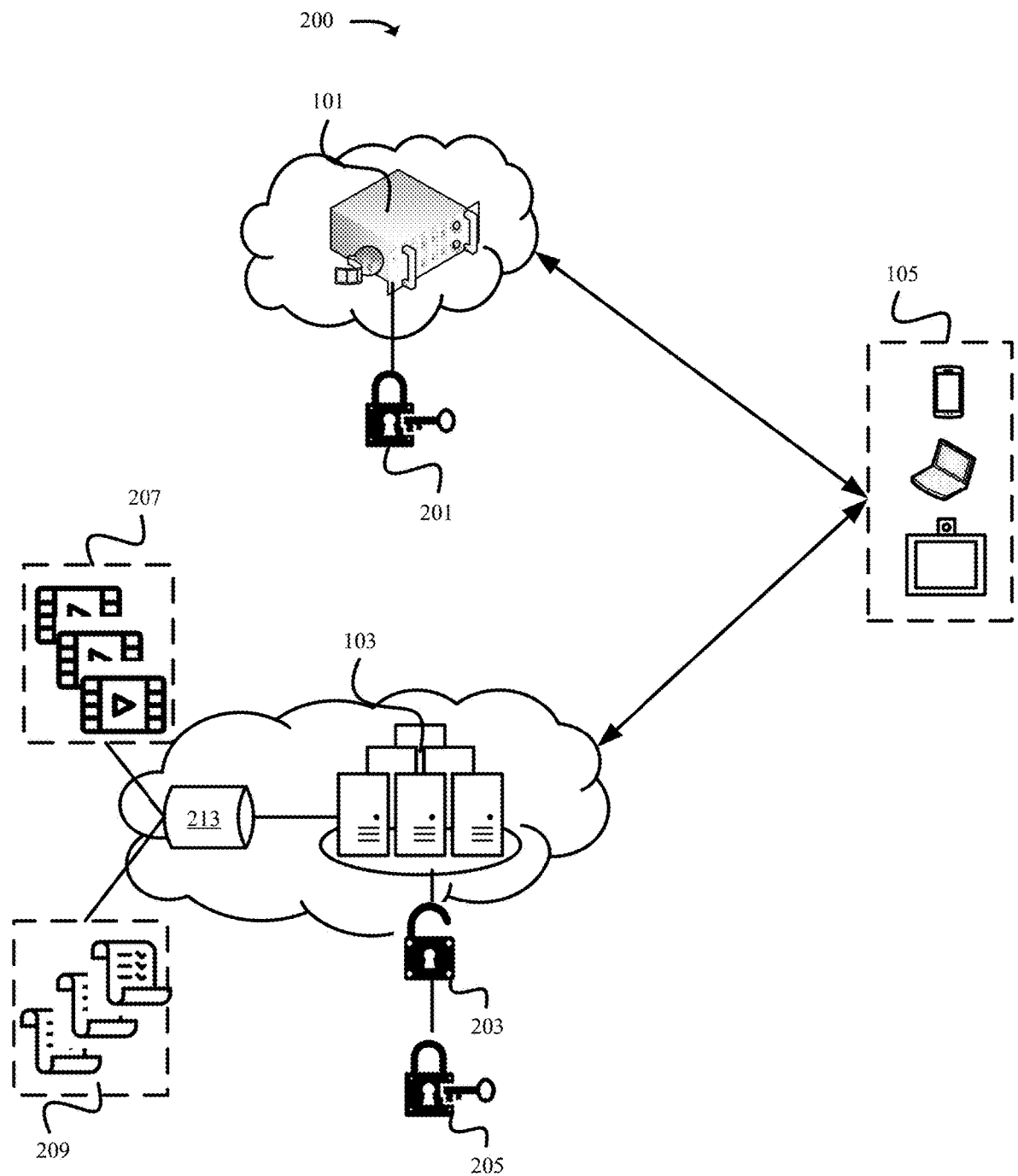
FIG. 2 illustrates an example architecture for a secure distribution system that secures stream distribution across different platforms using an access token and client token in accordance with some embodiments presented herein.

FIG. 2 illustrates an example architecture 200 for a secure distribution system that secures stream distribution across different platforms using an access token and client token in accordance with some embodiments presented herein. The secure distribution system includes stream service provider 101, one or more distribution platforms 103, access token private key 201, access token public key 203, client token key 205 (used for symmetric key encryption), streams 207 (e.g., media streams and/or media content) that are distributed from the one or more distribution platform 103, and access controls 209 that are specified for streams 207.

Stream service provider 101 corresponds to one or more sites, services, or network nodes from which client devices 105 access a set of media streams and/or other media content made available by stream service provider 101. In some embodiments, stream service provider 101 provides secure conferencing or meeting solutions. In some such embodiments, each media stream corresponds to a webinar, conference, or other live audio and/or video feed of multiple participants engaging with one another and/or collaborating on a project or task. Securing access to the media streams includes restricting which users and/or devices are permitted to join the different webinars, conferences, or live feeds, restricting the controls, actions, and/or interactions that each user and/or device may perform when participating in a webinar, conference, or live feed, and/or other restrictions related to accessing the different content that is accessible within each webinar, conference, or live feed. In some other embodiments, stream service provider 101 provides secure access to a library of movies, television shows, user-generated content, social media content, and/or other video streams. In some such embodiments, securing access to the media streams include restricting which users and/or devices are permitted to access which media streams, where and when the media streams are accessible, the quality, resolution, and/or other parameters with which the media streams are distributed to the client devices, and/or other restrictions associated with individual media stream access.

Stream service provider 101 is accessible from a first domain, network, and/or address. In some embodiments, stream service provider 101 registers, creates, and stores accounts for registered users and/or client device 105, authorizes service access based on access credentials associated with each registered account, and/or provides an interface or application programming interface ("API") with which different media streams provided by stream service provider 101 may be requested and/or accessed. However, stream service provider 101 does not distribute the media streams to all authorized client devices 105, and does not maintain the resources or infrastructure for the stream distribution. Instead, stream service provider 101 relies on one or more distribution platforms 103 for the distribution of the media streams to the authorized client device 105. For instance, a first set of media streams of stream service provider 101 may be provisioned to and distributed using resources of a first distribution platform, and a second set of media streams of stream service provider 101 may be provisioned to and distributed using resources of a second distribution platform.

Distribution platform 103 corresponds to a CDN, cloud hosting platform, or other platform with distributed resources that may be allocated to stream service provider 101 and/or other stream service providers for the distribution of their media streams and media content. The distribution resources include servers, distribution nodes, and/or devices or machines that are distributed to different points-of-presence ("POP") or locations, and that may be used to securely stream content to different client devices 105. The distribution platform resources are accessible from a second domain, network, and/or address. Specifically, the distribution resources may be located at different network edges that are more geographically proximate to the locations of client devices than stream service provider 101 in order to reduce the number of network hops between client devices and the distribution resources of distribution platform 103 that securely stream requested events and/or streams to those client devices.

Stream service provider 101 may configure and execute various applications on the allocated distribution platform resources. For instance, stream service provider 101 may configure edge compute functionality of the allocated distribution platform resources for the access token verification, client token generation, and client token verification associated with the secure stream distribution. Moreover, the allocated distribution platform resources may be configured to enforce different access restrictions for different streaming content. For instance, the distribution platform resources may enforce a geographic restriction for a first media stream that prevents client devices outside a specified geographic region from accessing the first media stream, and may enforce a device type restriction for a second media stream that prevents client devices of a certain type from accessing the second media stream at a particular resolution, bitrate, and/or with a particular streaming protocol.

For the access token generation and verification, stream service provider 101 retains access token private key 201, and configures distribution platform 103 with access token public key 203. In some embodiments, each streaming node of distribution platform 103 may be configured with access token public key 203. In some other embodiments, access token public key 203 may be stored in a central storage that each stream distribution node has access to.

For the client token generation and verification, distribution platform 103 is configured with a single client token key 205. The streaming nodes of distribution platform 103 are configured to generate the client token for a particular client device with client token key 205 in response to successfully verifying an access token provided by that particular client device with access token public key 203.

In some embodiments, different streams 207 of stream service provider 101 are cached and distributed from different streaming nodes of distribution platform 103. In some such embodiments, each streaming node may be configured with access controls 209 for the media streams and/or media content distributed by that streaming node. Access controls 209 include various device type, geographic, time-of-day, and/or other restrictions for limiting the manner with which the different streams 207 may be accessible.

In some other embodiments, streams 207 and/or access controls 209 are stored in repository 213. Each distribution platform 103 POP may have repository 213, and the set of streaming nodes within a PoP may retrieve and distribute any stream within that repository 213, and obtain access controls 209 for a requested stream from that repository 213.

In some embodiments, streams 207 correspond to live events (e.g., webinars, conferences, concerts, sporting events, etc.). The secure distribution of a live event includes receiving inputs streams from one or more client devices 105, creating a unified output stream by combining the input streams, encoding and securely distributing the output stream to one or more client devices 105 that have been authorized to access the live event via the access token and client token verifications.

Figure 3:
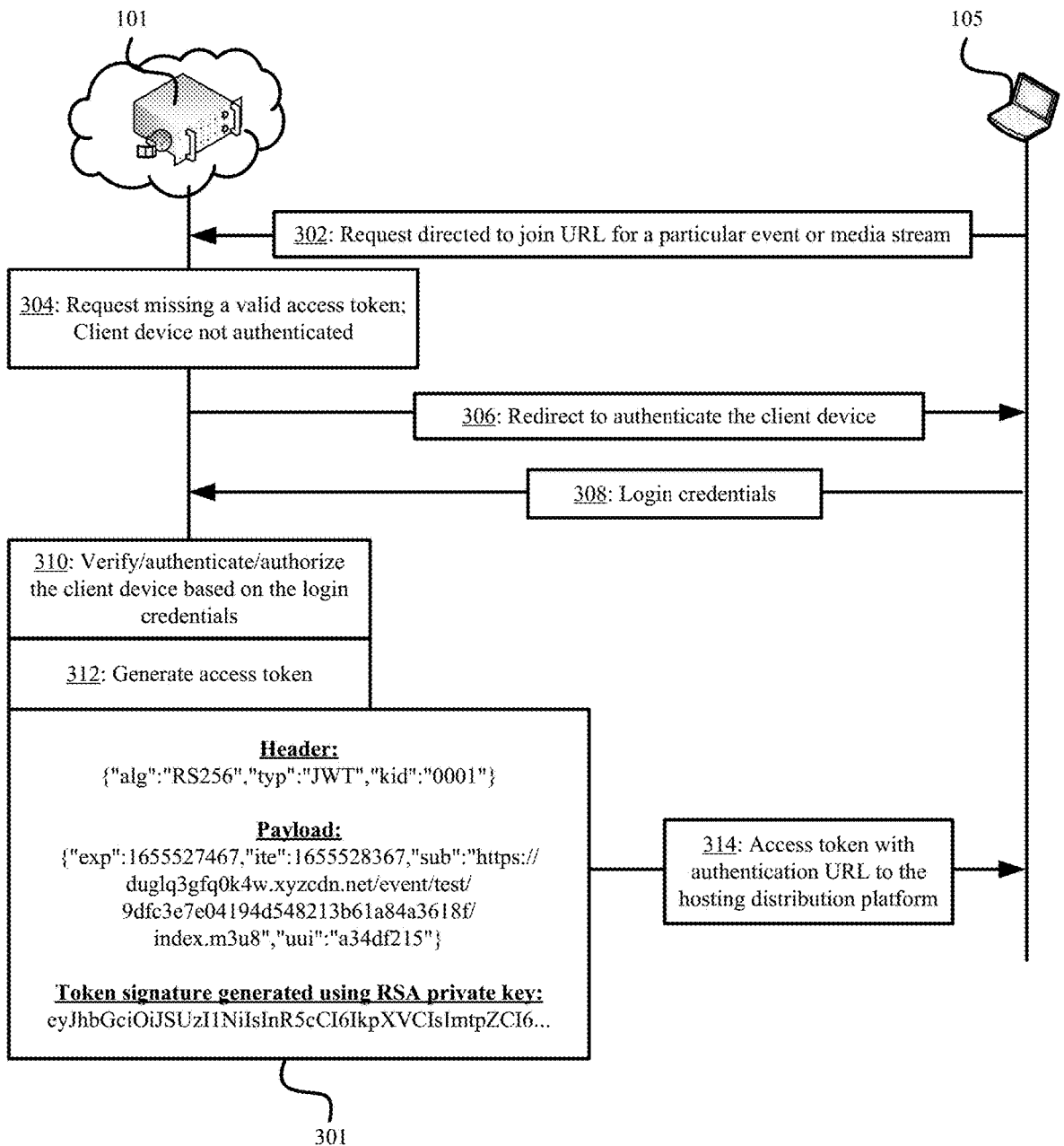
FIG. 3 illustrates an example of generating and using the access token as a first security verification for secure stream distribution in accordance with some embodiments presented herein.

FIG. 3 illustrates an example of generating and using the access token as a first security verification for secure stream distribution in accordance with some embodiments presented herein. Client device 105 issues (at 302) a request to join an event or stream via a join URL. The request may include an HTTP POST message, and the join URL may specify a first domain name of stream service provider 101 and a path or one or more identifiers for the requested event or stream. In other words, the join URL is not the link to directly access the requested event or stream. Instead, the join URL is a request to stream service provider 101 that identifies the requested event or stream and that provides further details of the specific stream URL.

Stream service provider 101 receives the request, and determines (at 304) that client device 105 has not been authenticated and/or authorized for access because the request does not include a valid access token. The lack of a valid access token indicates that client device 105 has not been authorized for access by stream service provider 101.

Accordingly, stream service provider 101 issues (at 306) a redirect message for client device 105 to authenticate with stream service provider 101. For instance, the redirect message may include an HTTP 401 message that transfers client device 105 to a secure login page or the instructs client device 105 to perform a secure login.

Client device 105 provides (at 308) login credentials to stream service provider 101. The login credentials may include a username and password, a name and email address, a unique identifying string, biometric information, and/or other information for authenticating client device 105 with stream service provider 101 and/or authorizing client device 105 access to events or streams offered by stream service provider 101. The login credentials may be entered into a user interface or login page, or may be provided via an API call.

Stream service provider 101 authorizes (at 310) client device 105 for access to the requested event or stream based on the login credentials matching stored credentials for a registered user. Accordingly, stream service provider 101 performs a first verification of client device 105 to determine whether client device 105 is authorized to access the request event or stream.

In some embodiments, two-factor authentication and/or additional authentication operations may be performed to ensure that the login credentials of a particular user are being used by the particular user and not another user, and therefore prevent other users or client devices from using the login credentials of a particular user or client device 105. In some embodiments, authorizing (at 310) client device 105 includes obtaining an invitee list that is stored for the requested event, comparing a name and/or email address provided (at 308) by client device 105 against the invitee list, rejecting the request based on the provided (at 308) name and/or email address not being specified in the invitee list, and authorizing (at 310) client device 105 for access to the requested event based on the provided (at 308) name and/or email address being specified in the invitee list.

In any case, authorizing (at 310) client device 105 includes using confidential and/or private information that stream service provider 101 has stored for client device 105 to perform a first verification, authentication, and/or authorization of client device 105. In some embodiments, the first verification, authentication, and/or authorization grants client device 105 access to the requested event or stream and/or transfers client device 105 to distribution platform 103 to access the requested event or stream. In some other embodiments, the first verification, authentication, and/or authorization grants client device 105 access to the streaming service and/or all events or streams that are available to client device 105 from stream service provider 101. For instance, after the first verification, stream service provider 101 may generate and provide an interface that presents the available events and/or streams to client device 105, and client device 105 may select a particular event or stream to access from distribution platform 103.

In response to verifying the user identity and/or authorizing (at 310) client device 105 for access, stream service provider 101 generates (at 312) access token 301 with which client device 105 may securely access the requested event or stream from distribution platforms 103. In some embodiments, generating (at 312) access token 301 includes encoding into access token 301 one or more of a URL for the requested event or stream, a token expiry time, a unique user identifier, a signing algorithm, a client identifier token key identifier, and a signature. Access token 301 is encoded using asymmetric key encryption with the access token private key that is known only to stream service provider 101 and that is not shared with others.

The URL for the requested event or stream may include a second domain name of distribution platform 103 where the requested event or stream is distributed from. The URL for the requested event or stream may further include a link to the manifest for the requested event or stream.

The token expiry time specifies the duration that access token 301 is valid for. Client device 105 is prevented from accessing the streaming service from stream service provider 101 using an expired access token and/or prevented from accessing the requested event or stream from distribution platform 103 using an expired access token, and will have to reauthenticate with stream service provider 101 once a generated access token has expired.

The unique user identifier is generated by stream service provider 101 based on the provided (at 308) login credentials and/or a combination of header values in the messaging received from client device 105. For instance, the unique user identifier may include a combination of two or more of the username, email address, login password, user-agent, versioning number, client device 105 location, a device fingerprint, HTTP Secure ("HTTPS") session key, and the like.

The client token uses a secret key to generate the signature which is a part of the client token. The identifier for the client token signature secret key (e.g., the client identifier token key identifier) is generated by stream service provider 101 and is a value that is passed to distribution platform 103 in access token 301 and that distribution platform 103 uses to generate the client token. In some embodiments, the client identifier token key identifier is an alphanumeric character string that is uniquely generated for each authorized client device 105.

Stream service provider 101 uses one of several encryption or secure hashing algorithms with the access token private key to generate the signature for access token 301. The selected encryption or hashing algorithm is identified in access token 301 in the signing algorithm field.

As shown in FIG. 3, access token 301 is a JavaScript Object Notation ("JSON") Web Token with a header, payload, and the encrypted signature. The header identifies the signing algorithm, the access token type (e.g., JWT), and the client identifier token key identifier. The payload identifies the expiry time, URL for the requested event or stream, and the unique user identifier. In some embodiments, access token 301 is defined with the header, payload, and encrypted signature. In some other embodiments, access token 301 excluders the header and payload and includes the encrypted signature that is generated from encoding the header and payload.

Stream service provider 101 sends (at 314) a response message with access token 301 that includes a distribution authentication platform URL to client device 105 in response to successfully performing the first verification of client device 105 that authenticates client device 105 and/or authorizes client device 105 for secure stream access to the requested event or stream. In some embodiments, the distribution authentication platform URL is the join URL with the first domain name of stream service provider 101 replaced with the second domain name of distribution platform 103 that distributes the requested event or stream. The second domain name may be obtained from the URL of the requested event or stream entered as part of access token 301.

Client device 105 reissues the request for the requested event or stream to distribution platform 103 that is identified in the distribution platform authentication URL for a second verification using access token 301. In some embodiments, access token 301 is provided as query string parameters, header parameters, or in the payload of the request directed to the distribution platform authentication URL.

Distribution platform 103 performs a second verification that includes verifying the signature in the access token using the public key that is stored with distribution platform 103 and that is associated with the private key used for access token signature generation (via RSA asymmetric key sign and verify mechanism). This ensures that client device 105 was authenticated and/or authorized for secure stream access by stream service provider 101 and further authenticates and/or authorizes client device 105 to securely receive a requested event or stream from distribution platform 103 using a different client token that is generated by distribution platform 103. Accordingly, the secure streaming provided by the secure distribution system includes stream service provider 101 performing a first verification with user account credentials or login credentials based on client device 105 accessing the streaming service from a first network or first domain of stream service provider 101, and generating a first token to be verified by the distribution platform 103. Furthermore, distribution platform 103 performs a first verification with the first token generated by stream service provider 101 as client device 105 transfers from the first network or first domain to a second network or second domain of distribution platform 103 and makes a first request with the access token. Distribution platform 103 also generates a second token (specific to the client device and based on pre-configured access restrictions) called the client token as part of the response to the first token verification, and further verifies the second token each time the media stream assets, as specified by the streaming service are accessed by the client device 105.

Figure 4:
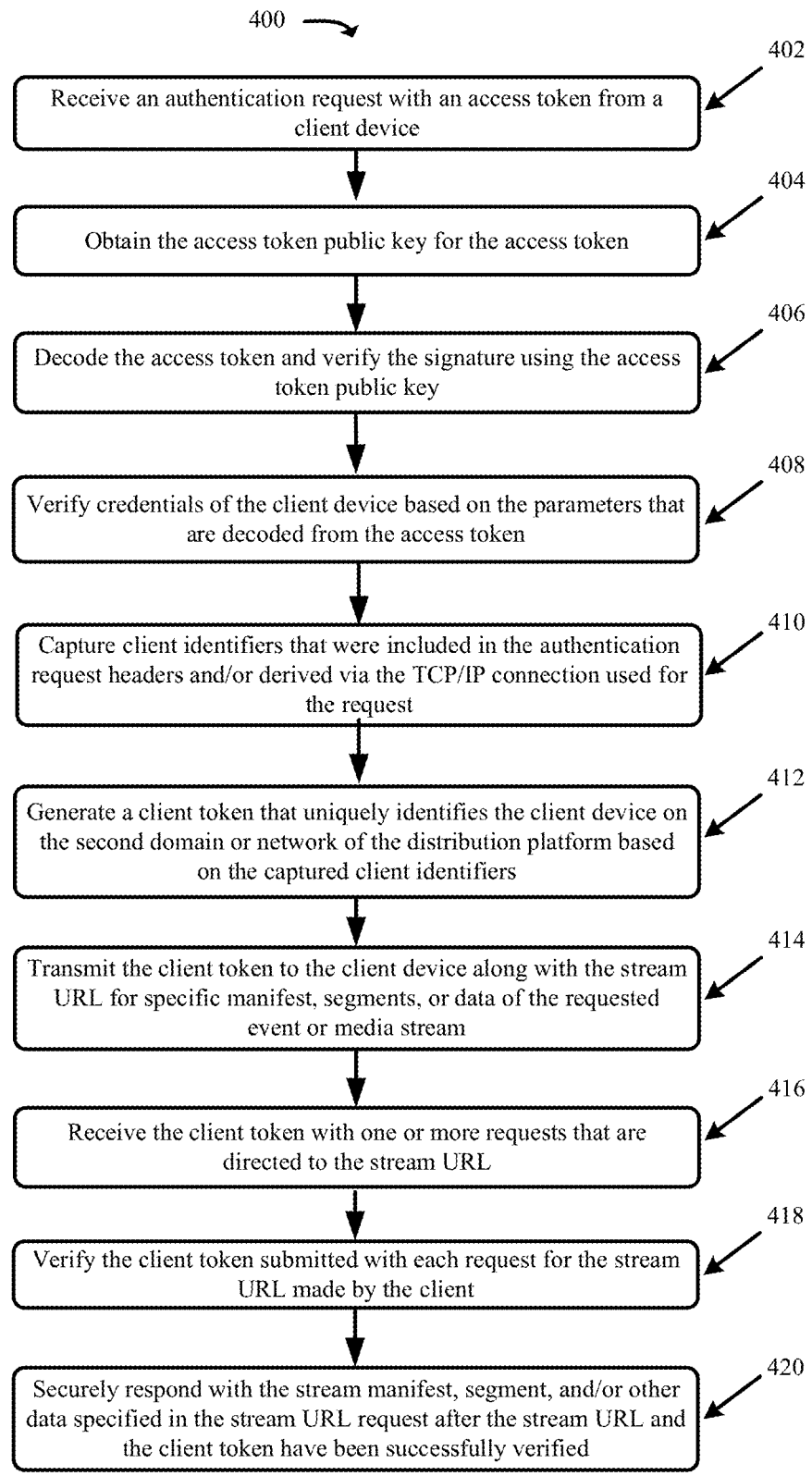
FIG. 4 presents a process for performing the second verification for secure stream distribution based on the access token and the client token in accordance with some embodiments presented herein.

FIG. 4 presents a process 400 for performing the second verification for secure stream distribution based on the access token and the client token in accordance with some embodiments presented herein. Process 400 is implemented by distribution platform 103. Specifically, process 400 is implemented by a particular distribution platform node that receives a request directed to the distribution platform authentication URL.

Process 400 includes receiving (at 402) an authentication request with an access token from client device 105. The authentication request is directed to the distribution platform authentication URL that stream service provider 101 provided with the access token to client device 105 upon client device 105 successfully completing the first verification with stream service provider 101.

Since distribution platform 103 does not have access to the account information (e.g., the username and password, attendee list, and/or other confidential or private user information) for the client devices that are registered with stream service provider 101 and/or for the streaming service managed by stream service provider 101, distribution platform 103 performs an alternative verification of client device 105 using the access token. Specifically, process 400 includes obtaining (at 404) the access token public key for access tokens that are generated by stream service provider 101 using the access token private key. Process 400 includes decoding (at 406) the access token, verifying (at 408) credentials of client device 105 based on the parameters that are decoded from the access token, and verifying the signature in the access token using the public key corresponding to the private key used for generating the access token signature.

Verifying (at 408) the credentials includes verifying that the access token is not expired, has not been modified or tampered with based on the values decoded from the access token and signature, and determining that the URL decoded from the access token matches the URL specified in the authentication request or is directed to the same event or stream requested with the authentication request. Additionally, distribution platform 103 may allow or disallow the client request based on the unique user identifier for client device 105 by checking against a pre-configured whitelist of UUIs stored at the distribution platform. In this manner, distribution platform 103 determines whether client device 105 issuing the authentication request was previously verified, authenticated, and/or authorized for stream access by stream service provider 101.

In response to successfully verifying (at 408) the credentials, process 400 includes capturing (at 410) client identifiers that were included in the header of the authentication request or derived via the authentication request TCP/IP connection. The client identifiers include two or more of the client device IP address, MAC address, user-agent, referrer, country, unique user identifier, and other values within the authentication request header and/or that may be derived or obtained based on the header values or the request TCP/IP connection.

The client identifiers uniquely identify client device 105 on the second domain or network of distribution platform 103. For instance, the IP address or MAC address of client device 105 may change when using a first network card or Internet Service Provider ("ISP") to access the first domain or network associated with stream service provider 101, and when using a second network card to access the second domain or network associated with distribution platform 103. Similarly, the user-agent may change when using a first application on client device 105 to access the streaming service from stream service provider 101, and when using a second application on client device 105 to access and/or playback the requested event or stream distributed from distribution platform 103.

Process 400 includes generating (at 412) a client token that uniquely identifies client device 105 on the second domain or network of distribution platform 103 based on the captured (at 410) client identifiers. Generating (at 412) the client token includes defining and encoding the client identifiers as a set of key-value pairs. In some embodiments, generating (at 412) the client token further includes defining and encoding stream and/or device restrictions into the client token.

In some embodiments, the client token is encoded with the client identifier token key identifier that was generated by stream service provider 101 and included as part of the access token, the token version, the client token signature, the client token expiry time, and the unique user identifier included with the access token.

The token version may be encoded to represent the encryption algorithm used to generate the signature and which of the tracked identifiers and/or key-value pairs are included within the client token. The client token signature is a hash value that is generated from applying the cryptographic hash associated with the selected encryption algorithm and/or the client token private key to the client token identifiers identified by the token version. For instance, a token version of "01" may indicate that the client token is generated by applying the SHA256 encryption/hash algorithm to the user-agent, path, expiry time, and unique user identifier, and a token version of "05" may indicate that the client token is generated by applying the SHA256 encryption/hash algorithm to the user-agent, path, referrer, IP address, expiry time, country, and unique user identifier. Accordingly, the encoding of the client time may be slightly varied for greater token security.

Process 400 include transmitting (at 414) the client token to client device 105 along with the stream URL that may be used to request specific manifests, segments, and/or data of the requested event or stream. In some embodiments, the stream URL includes two or more links for accessing the stream data using different HTTP-based streaming protocols such as HLS, HDS, or DASH as some examples. The stream URL may be obtained from the decoded parameters of the access token, or may be dynamically selected by distribution platform 103 based on a cached or stored location of the stream data in distribution platform 103 that may be unknown to stream service provider 101.

Process 400 includes receiving (at 416) the client token with one or more requests that are directed to the stream URL and that directly identify one or more manifests, segments, and/or other data of the requested event or stream. In some embodiments, the client token is appended as query string parameters of the one or more requests. In some other embodiments, the client token is included as a header parameter or in the payload of the one or more requests.

Process 400 includes verifying (at 418) each stream URL request for a manifest, segment, and/or other data of a requested event or stream using the client token. Verifying (at 418) each stream URL request includes decoding the client identifiers encoded as part of the client identifier using the client token key, and comparing the decoded client identifiers to the client identifiers included in the header of the stream URL request. In some embodiments, verifying (at 418) each stream URL request also includes decoding stream access restrictions from the client token, and determining that client device 105 submitting the stream URL request satisfies the decoded stream access restrictions. For instance, the decoded stream access restrictions may prevent client device 105 from accessing the stream at a particular resolution, at a particular time-of-day, from a particular device type, etc. In other embodiments, verifying (at 418) each stream URL request includes verifying the client token signature using the client token key and the decoded identifiers from the client token.

Process 400 includes securely streaming (at 420) the stream manifest, segment, and/or other data specified in the stream URL of a stream URL request in response to verifying (at 418) that stream URL request. In other words, distribution platform 103 securely streams (at 420) requested content to client device 105 after having performed the second verification to authenticate that client device 105 issuing the stream URL request across the second domain or network of distribution platform 103 is the same client device that is identified in the client token, and to verify that the authenticated client device 105 is authorized to access the requested stream.

Figure 5:
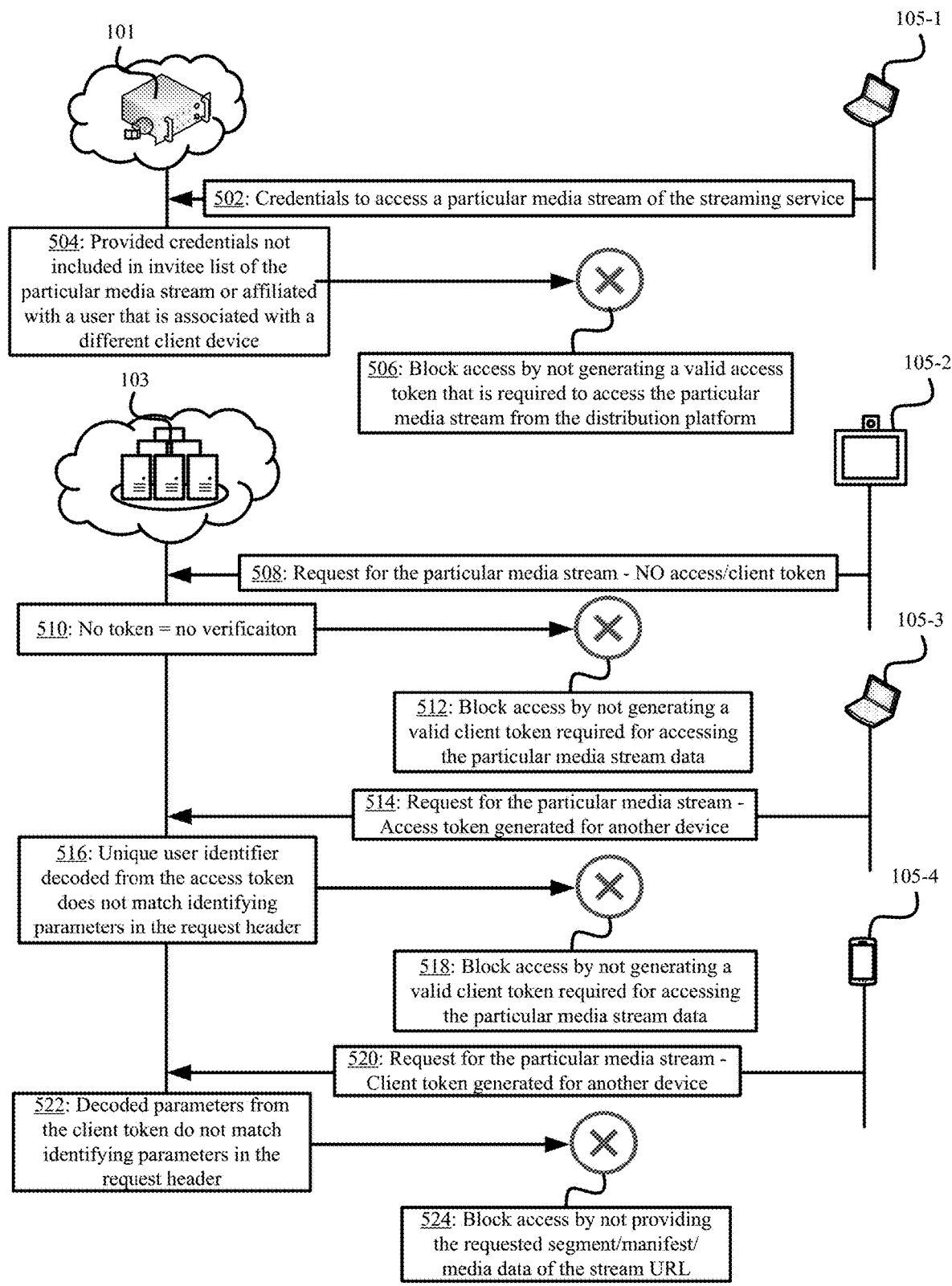
FIG. 5 illustrates an example of securing access to a particular stream at different point of access within a secure distribution system based on a first verification performed using the access token and a second verification performed using the client token in accordance with some embodiments presented herein.

FIG. 5 illustrates an example of securing access to a particular stream at different point of access within a secure distribution system based on a first verification performed using the access token and a second verification performed using the client token in accordance with some embodiments presented herein. FIG. 5 illustrates different client devices 105-1, 105-2, 105-3, and 105-4 (collectively referred to as "client devices 105" or individually as "client device 105") attempting unauthorized access of the particular stream from the different points of access.

First client device 105-1 issues a request to stream service provider 101 with the join URL for the particular stream. Stream service provider 101 requests login credentials for verifying access to the particular stream. First client device 105-1 provides (at 502) stream service provider 101 with invalid credentials as part of the request procedure with stream service provider 101 to access or join the particular stream identified by a valid join URL. Stream service provider 101 determines (at 504) that the credentials are invalid based on the provided username or email address not being included in the invitee list for the particular stream, or the login credentials identifying another user that is not associated with first client device 105-1. Accordingly, stream service provider 101 blocks (at 506) access to the particular stream by not issuing a valid access token that is required to access the particular stream from distribution platform 103.

Second client device 105-2 has obtained the distribution platform authentication URL for requesting the particular stream from distribution platform 103 or the stream URL for a manifest, segment, or other data of the particular stream, and issues (at 508) a request that is directed to the distribution platform authentication URL or the stream URL without an access token or a client token. Distribution platform 103 determines that the distribution of the particular stream is secured and cannot be accessed without having performed the first verification with stream service provider 101 and the second verification with distribution platform 103. In particular, distribution platform 103 detects (at 510) that the first verification was not performed by the absence of a valid access token accompanying the request, and detects (at 510) that the second verification was not performed by the absence of a valid client token accompanying the request.

Distribution platform 103 rejects (at 512) the request by not issuing the client token that is required for accessing the particular stream from distribution platform 103. In some embodiments, distribution platform 103 issues an error message, and redirects second client device 105-2 to stream service provider 101 for the first verification.

Third client device 105-3 intercepts or otherwise obtains a valid access token that stream service provider 101 generated for another client device requesting the particular stream. Third client device 105-3 issues (at 514) a request for the particular stream with the valid access token of another client device to the distribution platform authentication URL. Distribution platform 103 verifies that the access token has not been altered or tampered with by decoding the access token and verifying the signature with the access token public key. However, distribution platform 103 determines (at 516) that the access token was not generated for or usable by second client device 105-2 based on the unique user identifier of the access token not matching to identifying parameters in the header of the request issued by third client device 105-3. Accordingly, distribution platform 103 prevents (at 518) third client device 105-3 from accessing the particular stream by not providing the stream URL for the particular stream and/or by not generating the client token that is required to access the particular stream manifest, segments, and/or other data.

Fourth client device 105-4 issues (at 520) a request with the stream URL for a manifest of the particular stream with a valid client token that distribution platform 103 created for another device accessing the particular stream. Distribution platform 103 decodes the client token using the client token key, and determines (at 522) that the decoded parameters do not match the client identifying parameters in the request header. Here again, distribution platform 103 prevents (at 524) fourth client device 105-4 from accessing the particular stream by not providing the stream or media data that is required to parse the particular stream manifest or playback the segments, and/or other media data.

The embodiments presented above are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the above descriptions are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying," "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things ("IoT") devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory ("RAM"), read only memory ("ROM"), electrically erasable programmable ROM ("EEPROM"), flash memory, or other memory technology, compact disk ROM ("CD-ROM"), digital versatile disks ("DVDs") or other optical storage, solid state drives, hard drives, hybrid drive, or any other medium that can be used to store the desired information and that can be accessed to retrieve that information.

It is appreciated that the presented systems and methods can be implemented in a variety of architectures and configurations. For example, the systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

What is claimed is:

1. A computer-implemented method for secure stream distribution, the computer-implemented method comprising:

receiving a first request from a client device at a first network node, wherein the first request comprises a first link for a particular stream of a streaming service that is accessed from a first domain associated with the first network node;

performing a first verification of the client device at the first network node based on one or more credentials provided by the client device matching stored credentials for the client device at the first network node;

generating a first token in response to performing the first verification, wherein generating the first token comprises encoding unique identifying information of the client device and a signature as part of the first token;

providing the first token with a second link to the client device in response to the first request and performing the first verification, wherein the second link is directed to a second domain associated with a second network node that distributes the particular stream on behalf of the streaming service;

determining, at the second network node, that the first network node performed the first verification of the client device based on a second request from the client device that includes the first token and that is directed to the second domain;

generating, at the second network node, a second token in response to determining that the first network node performed the first verification, wherein generating the second token comprises encoding a link to specific data of the particular stream and two or more identifiers that uniquely identify the client device in the second request; and streaming the specific data from the second network node to the client device in response to performing a second verification of the client device at the second network node based on one or more requests for the specific data comprising the second token and the two or more identifiers encoded as part of the second token.

2. The computer-implemented method of claim 1 further comprising:
providing the second token and the link to the specific data from the second network node to the client device in response to the second request and determining that the first network node performed the first verification.

3. The computer-implemented method of claim 1, wherein performing the first verification comprises:
receiving a particular identifier that the client device uses to join a conference or webinar;
obtaining an invitee list defined for the conference or webinar; and
verifying the client device in response to the particular identifier matching an identifier in the invitee list.

4. The computer-implemented method of claim 1, wherein encoding the unique identifying information of the client device comprises:
retrieving, at the first network node, a private key that is selected for said generating of the first token and that is stored on the first network node; and
generating, at the first network node, a hash value of the unique identifying information of the client device using the private key.

5. The computer-implemented method of claim 4, wherein determining that the first network node performed the first verification comprises:
retrieving, at the second network node, a public key for the private key that was selected for said generating of the first token at the first network node;
decoding, at the second network node, the unique identifying information of the client device from the first token using the public key;
verifying the signature in the token using the public key; and
authenticating, at the second network node, the client device based on the unique identifying information that is decoded from the first token matching client identifying information in the second request and said verifying the signature.

6. The computer-implemented method of claim 1, wherein encoding the link to the specific data and the two or more identifiers comprises:
retrieving a key that is selected for said generating of the second token and that is stored on the second network node; and
generating a hash value of the second link and the two or more identifiers using the key.

7. The computer-implemented method of claim 6, wherein streaming the specific data comprises:
receiving the one or more requests for the specific data with the second token from the client device at the second network node;
retrieving the key that is selected for said generating of the second token at the second network node;
decoding the second link and the two or more identifiers from the second token using the key; and
authenticating the client device based on one or more requests being directed to the second link that is decoded from the second token and comprising the two or more identifiers that are decoded from the second token.

8. The computer-implemented method of claim 1 further comprising:
rejecting, at the second network node, a third request from the client device that is directed to the particular stream and that omits the first token or comprises a token that differs from the first token.

9. The computer-implemented method of claim 8 further comprising:
rejecting, at the first network node, a fourth request from the client device that is directed to the particular stream and that omits the one or more credentials or contains credentials that do not match the stored credentials for the client device.

10. The computer-implemented method of claim 8 further comprising:
rejecting, at the second network node, a fourth request from the client device that is directed to the specific data and that omits the second token or comprises a token that differs from the second token.

11. A secure streaming system comprising:
a first network node that is accessed via a first domain, the first network node comprising one or more hardware processors configured to:
receive a first request from a client device, wherein the first request comprises a first link for a particular stream of a streaming service that is accessed from the first domain;
perform a first verification of the client device based on one or more credentials provided by the client device matching stored credentials for the client device at the first network node;
generate a first token in response to performing the first verification, wherein generating the first token comprises encoding unique identifying information of the client device and a signature as part of the first token;
provide the first token with a second link to the client device in response to the first request and performing the first verification, wherein the second link is directed to a second domain associated with a second network node that distributes the particular stream on behalf of the streaming service; and
a second network node that is accessed via the second domain, the second network node comprising one or more hardware processors configured to:
determine that the first network node performed the first verification of the client device based on a second request from the client device that includes the first token and that is directed to the second domain;
generate a second token in response to determining that the first network node performed the first verification, wherein generating the second token comprises encoding a link to specific data of the particular stream and two or more identifiers that uniquely identify the client device in the second request; and
stream the specific data from the second network node to the client device in response to performing a second verification of the client device based on one or more requests for the specific data comprising the second token and the two or more identifiers encoded as part of the second token.

12. The secure streaming system of claim 11, wherein the one or more hardware processors of the second network node are further configured to:

provide the second token and the link to the specific data to the client device in response to the second request and determining that the first network node performed the first verification.

13. The secure streaming system of claim 11, wherein performing the first verification comprises:
receiving a particular identifier that the client device uses to join a conference or webinar;
obtaining an invitee list defined for the conference or webinar; and
verifying the client device in response to the particular identifier matching an identifier in the invitee list.

14. The secure streaming system of claim 11, wherein encoding the unique identifying information of the client device comprises:
retrieving, at the first network node, a private key that is selected for said generating of the first token and that is stored on the first network node; and
generating, at the first network node, a hash value f the unique identifying information of the client device using the private key.

15. The secure streaming system of claim 14, wherein determining that the first network node performed the first verification comprises:
retrieving, at the second network node, a public key for the private key that was selected for said generating of the first token at the first network node;
decoding, at the second network node, the unique identifying information of the client device from the first token using the public key;
verifying the signature in the token using the public key; and
authenticating, at the second network node, the client device based on the unique identifying information that is decoded from the first token matching client identifying information in the second request and said verifying the signature.

16. The secure streaming system of claim 11, wherein the one or more hardware processors of the second network node are further configured to:
reject a third request from the client device that is directed to the particular stream and that omits the first token or comprises a token that differs from the first token.

17. The secure streaming system of claim 16, wherein the one or more hardware processors of the first network node are further configured to:
reject a fourth request from the client device that is directed to the particular stream and that omits the one or more credentials or contains credentials that do not match the stored credentials for the client device.

18. The secure streaming system of claim 16, wherein the one or more hardware processors of the second network node are further configured to:
reject a fourth request from the client device that is directed to the specific data and that omits the second token or comprises a token that differs from the second token.

19. A non-transitory computer-readable medium storing program instructions that, when executed by one or more hardware processors of a secure distribution system, cause the secure distribution system to perform operations comprising:
receive a first request from a client device at a first network node of the secure distribution system, wherein the first request comprises a first link for a particular stream of a streaming service that is accessed from a first domain associated with the first network node;
perform a first verification of the client device at the first network node based on one or more credentials provided by the client device matching stored credentials for the client device at the first network node;
generate a first token in response to performing the first verification, wherein generating the first token comprises encoding unique identifying information of the client device and a signature as part of the first token;
provide the first token with a second link to the client device in response to the first request and performing the first verification, wherein the second link is directed to a second domain associated with a second network node of the secure distribution system that distributes the particular stream on behalf of the streaming service;
determine, at the second network node, that the first network node performed the first verification of the client device based on a second request from the client device that includes the first token and that is directed to the second domain;
generate, at the second network node, a second token in response to determining that the first network node performed the first verification, wherein generating the second token comprises encoding a link to specific data of the particular stream and two or more identifiers that uniquely identify the client device in the second request; and
stream the specific data from the second network node to the client device in response to performing a second verification of the client device based on one or more requests for the specific data comprising the second token and the two or more identifiers encoded as part of the second token.

* * * * *